324-77.

SR 05-25-71 OR 3,581,192

[11] 3,581,192

[72] Inventors Tanetoshi Miura
Kokubunji-shi;
Tsuneji Koshikawa, Tokorozawa-shi;
Yasuaki Nakano, Hino-shi; Takeshi
Nakayama, Hino-shi, all of, Japan

[21] Appl. No. 775,343
[22] Filed Nov. 13, 1968
[45] Patented May 25, 1971
[73] Assignee Hitachi, Ltd.
Tokyo-To, Japan

[54] FREQUENCY SPECTRUM ANALYZER WITH DISPLAYABLE COLORED SHIFTABLE FREQUENCY SPECTROGRAM
11 Claims, 15 Drawing Figs.

[52] U.S. Cl. ........ 324/77, 179/1
[51] Int. Cl. ........ G01r 23/16
[50] Field of Search ........ 324/77 (B), 77 (C), 77 (C-S); 280/83.3 (IRI); 179/1 (AS), (VIS); 315/30

[56] References Cited
UNITED STATES PATENTS

| | | | |
|---|---|---|---|
| 2,804,500 | 8/1957 | Giacoletto | 179/1 |
| 3,165,586 | 1/1965 | Campanella | 324/77X |
| 3,441,850 | 4/1969 | Frazer et al. | 324/77 |

*Primary Examiner*—Edward E. Kubasiewicz
*Attorney*—Craig, Antonelli, Stewart & Hill

ABSTRACT: Sound signal is analyzed so that there are provided a plurality of different constituent frequency components by means of a set of band-pass filters, and the thus analyzed frequency components are time-sequentially supplied to a color display which employs a color picture tube and its associate circuits for displaying different colors representative of the intensities of the frequency components.

INVENTORS
TANETOSHI MIURA
TSUNEJI KOSHIKAWA
YASUAKI NAKANO
TAKESHI NAKAYAMA

BY Craig, Antonelli, Stewart & Hill
ATTORNEYS

UCS CHROMATICITY DIAGRAM x-y CHROMATICITY DIAGRAM

FREQUENCY SPECTRUM ANALYZER WITH DISPLAYABLE COLORED SHIFTABLE FREQUENCY SPECTROGRAM

FIELD OF THE INVENTION

This invention relates to a frequency spectrum analyzer which operatingly analyzes the change in the intensities of the constituent frequency components of an input signal applied thereto, such as a human voice signal, ultrasonic sound obtained from a sonar system, or the like, and more particularly to a frequency spectrum analyzer with a real time color displaying device, which operatingly produces a color spectrogram in real time wherein the respective intensity informations of the analyzed frequency components are represented by different colors.

Such frequency spectrum analyzers as described above are particularly useful in sonar systems or for sound analysis, e.g., observation of frequency characteristics of reverberations in a concert hall, for music instruments and so on. They are, in general, comprised by frequency analyzing components and display components, the former operatingly distinguishing the intensities of different frequency components which constitute an input signal and the latter operatingly translating the intensity information of the frequency components into a visual display.

As for practical requirements, such frequency spectrum analyzers should provide a quick and accurate visual display as the input signal varies. However, the preexisting frequency spectrum analyzers are insufficient either in providing quick response or in the capability of supplying a satisfactory visual display with good accuracy.

One of the objects of the present invention is to provide a new and improved frequency spectrum analyzer which obviates the insufficiencies of prior devices.

Another object is to provide an improved frequency spectrum analyzer which can perform quick analysis of the frequency spectrum of an input signal analysis and display visual information in real time in response to variations of the input signal.

Other objects, features, and effects of the present invention will be hereinafter described in detail taken in conjunction with the drawings.

BACKGROUND OF THE INVENTION

Figure 1:
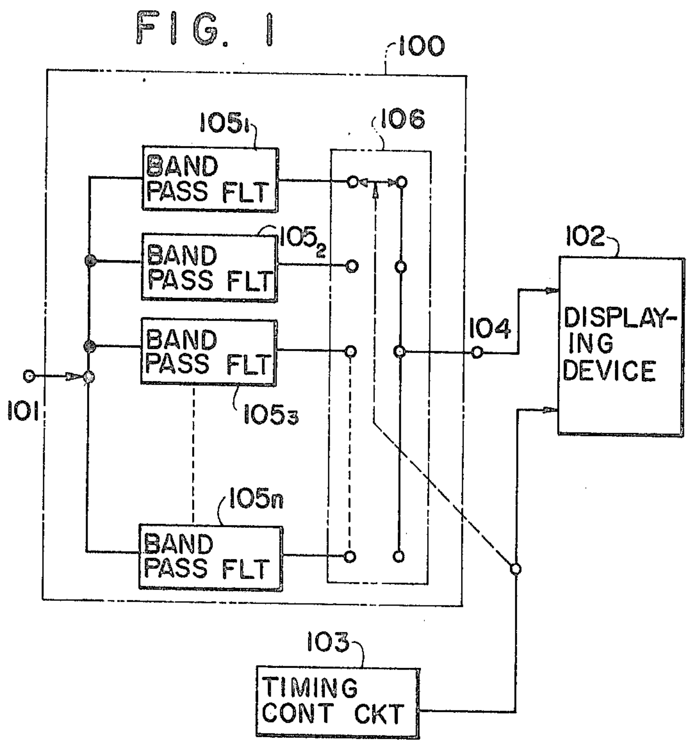
FIG. 1 is a diagram of one conventional frequency spectrum analyzer.

One of the most widely adopted arrangements of the prior art is shown in FIG. 1 wherein there is provided a frequency spectrograph 100 connected to a display device 102 including a monochrome picture tube, and a timing control circuit 103. The real time spectrograph 100 has an input terminal 101, an output terminal 104, a set of *n* band-pass filters 105 to 105*n* (where *n* is an integer) and a scanner 106.

To the input terminal 101 of the spectrograph 100 an input signal to be analyzed is impressed and it is supplied in parallel to the set of band-pass filters, each having its own pass-band different from the pass-band of the other filters but together covering a certain continuous frequency range, so that the input signal is divided into its constituent frequency sections with their different intensities. The scanner 106 operatingly transmits the outputs of the respective band-pass filters to the output terminal 104 one after another at intervals of a period of time $\tau$.

The output signal thus obtained at the output terminal 104 from each filter applies a brightness modulation onto the monochrome picture tube of the displaying device 102 in response to the respective intensities thereof. The timing control circuit 103 controls the scanning speeds on both the scanner and the displaying device in such a manner that the scanner may switch from one band-pass filter to another at an interval of $\tau$, and one of the coordinate scanning axes of the displaying device, for example the vertical scanning axis, is scanned with the scanning speed of *n* and the other axis, i.e., the horizontal scanning axis, is scanned with a speed substantially longer than $n\tau$. Consequently, the displaying device can provide a frequency spectrogram as shown in FIG. 2 wherein the vertical axis represents the frequency range and the horizontal axis is time.

Figure 2:
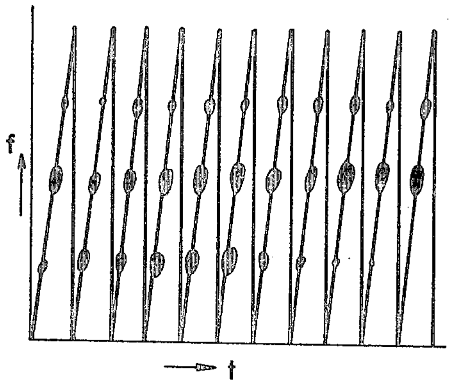
FIG. 2 is an explanatory showing of a frequency spectrogram obtained from the apparatus of FIG. 1.

As is apparent from FIG. 2, the respective data from the set of band-pass filters are displayed in the form of a light spot, each being brightness modulated in accordance with the intensities of the data corresponding thereto. The frequency spectrum analyzer of this type is, however, defective for the following reasons.

First, the dynamic range of the display obtained on a monochrome picture tube is no more than 30 db. because of its brightness characteristics, and it decreases in practical use to about 20 db. due to the influence of ambient light.

Second, the display cannot last too long though the time scale in the horizontal axis may be set to be any desired length; in other words, where there is a requirement to observe the change of the input signal for substantially long periods of time such as 1 or 2 seconds, it is impossible to hold the respective spots for such a long period on the picture tube unless the tube has a long persistance phosphor or is a storage or memory-scope type tube.

To attain the requirement of long period observation, the use of a temporal memory device is considered to be effective, which device records the whole spectrum of data to be displayed and then reproduces the recorded contents in high speed to the usual displaying device. However, this type of device is still unsatisfactory since the display cannot be obtained in real time.

Figure 3:
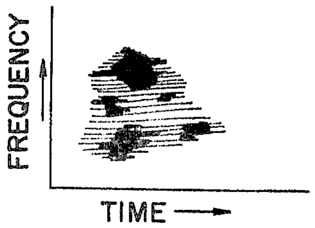
FIGS. 3 and 4 are other frequency spectrograms obtained from other conventional apparatus.

Another type of display is made on a discharge responsive paper as shown in FIG. 3 through a discharge controller whose discharge intensity is representative of the analyzed frequency sections, but this arrangement is also poor in its dynamic range of 6 to 12 db.

Figure 4:
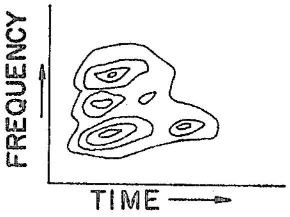

A still further type of display is provided in an equal contour form resembling a contour map as shown in FIG. 4 and is formed by quantizing the intensity of the data applied for display. However, with this arrangement it can not be determined whether the apex or bottom is displayed. Further, this type of device cannot respond to the input information in real time.

In order to attain a real time response against the input change, a time compression technique is adopted in accordance with the present invention. Further, in order to improve the dynamic range in the display, a colored displaying device is also adopted.

DESCRIPTION OF THE PREFERRED EMBODIMENT

Figure 5:
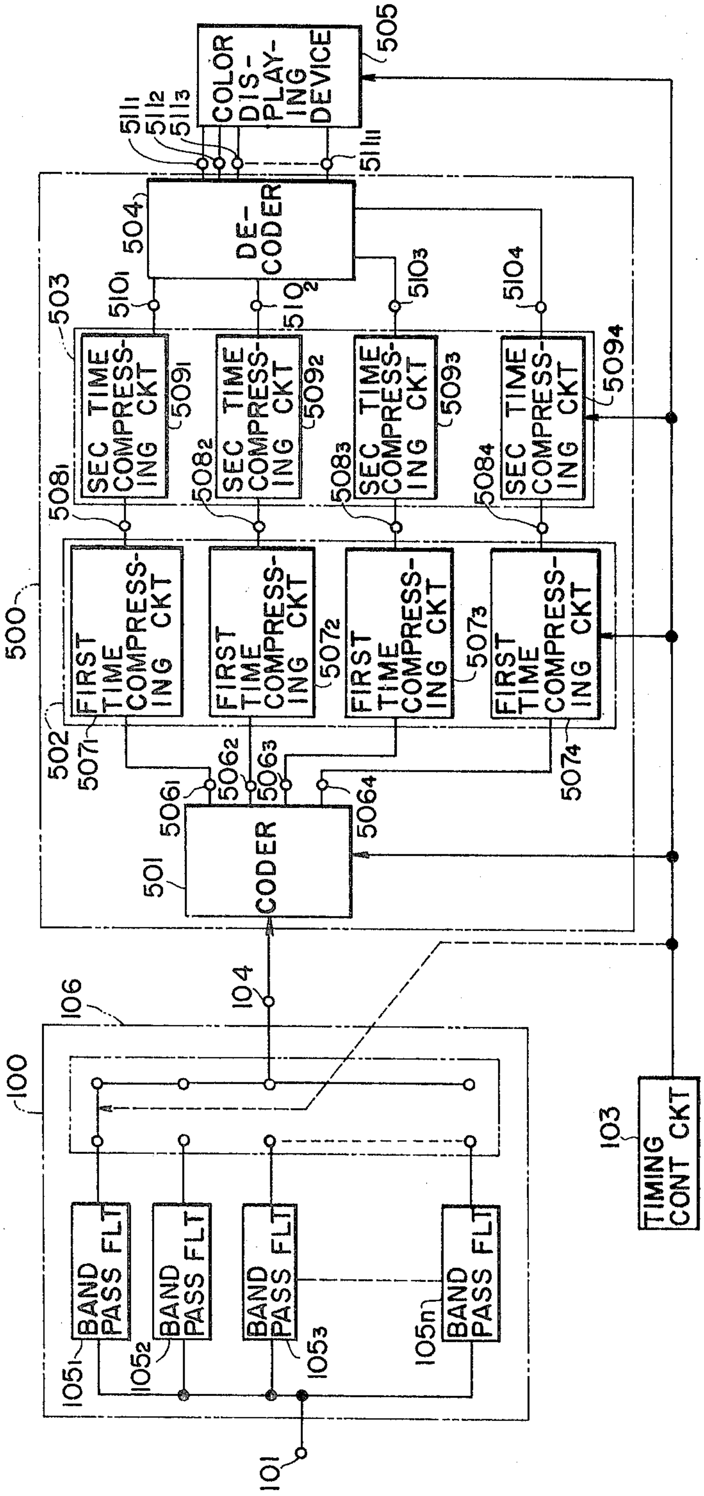
FIG. 5 is a diagram of one embodiment according to the present invention.

Referring now to FIG. 5 which shows a diagram of one embodiment of the present invention, the same reference numerals being used as provided in FIG. 1 to designate corresponding parts, the reference numeral 500 designates a time compressing device which is one of the essential parts of the invention and which comprises a coder or analog-to-digital converter 501 (which is hereafter referred to as A/D converter) supplied with the output of the scanner 106, a first and a second time compressor 502 and 503, respectively, and a decoder or color control signal generator 504. The reference numeral 505 designates a color displaying device including a color picture tube and its associated circuits.

The coder 501 may be in any conventional type as long as it operatingly quantizes the intensity of the signal applied thereto into a plurality of distinguishable levels, for example, according to the present embodiment, the signal intensity is graded into 11 different levels of 4 db. each, and the thus graded signals are converted into a binary 4 bit digital signal representative of the grade thereof, respectively.

Figure 6:
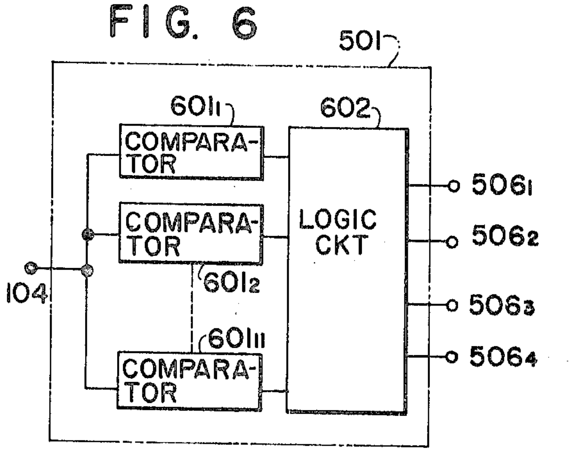
FIGS. 6, 7, 9, 10 and 13 show detailed circuit diagrams of the various constituent parts of the embodiment of FIG. 5.

As one example of the coder 501, a known parallel comparative type A/D converter is shown in FIG. 6, which comprises 11 different level comparators $601_1$ to $601_{11}$ whose levels differ by 4 db. from each other, and a known logic circuit 602, so that the time sequential output signals at the terminal 104 representative of the respective frequency sections are supplied in parallel to the comparators one by one with an interval of $\tau$. Accordingly, the signals at the terminal 104 are converted into parallel 4 bit digital pulse codes indicating their strengths, respectively.

It may be possible to construct the comparators to have a logarithmically preset level difference therebetween which is preferable in quantization of a signal of wide dynamic range such as, for example, a human voice.

Figure 7:
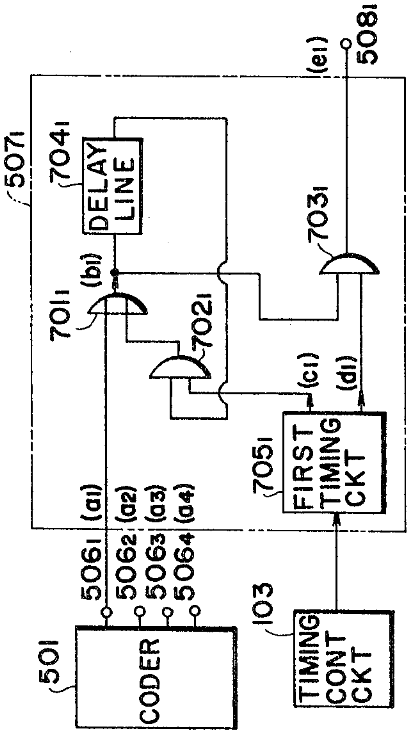

At the output terminals $506_1$ to $506_4$ of the coder 501, parallel 4 bit digital pulse codes are obtainable, each composed of constituent signals $a_1$, $a_2$, $a_3$, and $a_4$ as shown in FIGS. 7 and 8 (*a*) with an interval $\tau$ therebetween.

The first time compressor 502 is constituted of a plurality of first time compressing circuits $507_1$ to $507_4$ of the same structure, each connected to a corresponding one of the output terminals $506_1$ to $506_4$ of the coder 501, respectively, whereby parallel 4 bit digital codes are time sequentially supplied in parallel to the time compressing circuits.

Referring now to FIG. 7 wherein there is provided one of the first time compressing circuits, $507_1$, which includes an OR circuit $701_1$ coupled to the output terminal $506_1$ and a delay line $704_1$ connected to the output of the OR circuit. The delay line $704_1$ operatingly provides a time delay of, for example, $(1-1/n)\tau$ on the signal passing therethrough, wherein $n$ is the number of the band-pass filters employed in the real time spectrograph 100, and for the purpose of explanation, $n$ is herein after defined as 5. The signal once applied from the terminal $506_1$ to the OR circuit $701_1$ is again applied to the OR circuit through the delay line $704_1$ and a first gate circuit $702_1$ after the period of delay-time.

Figure 8B:
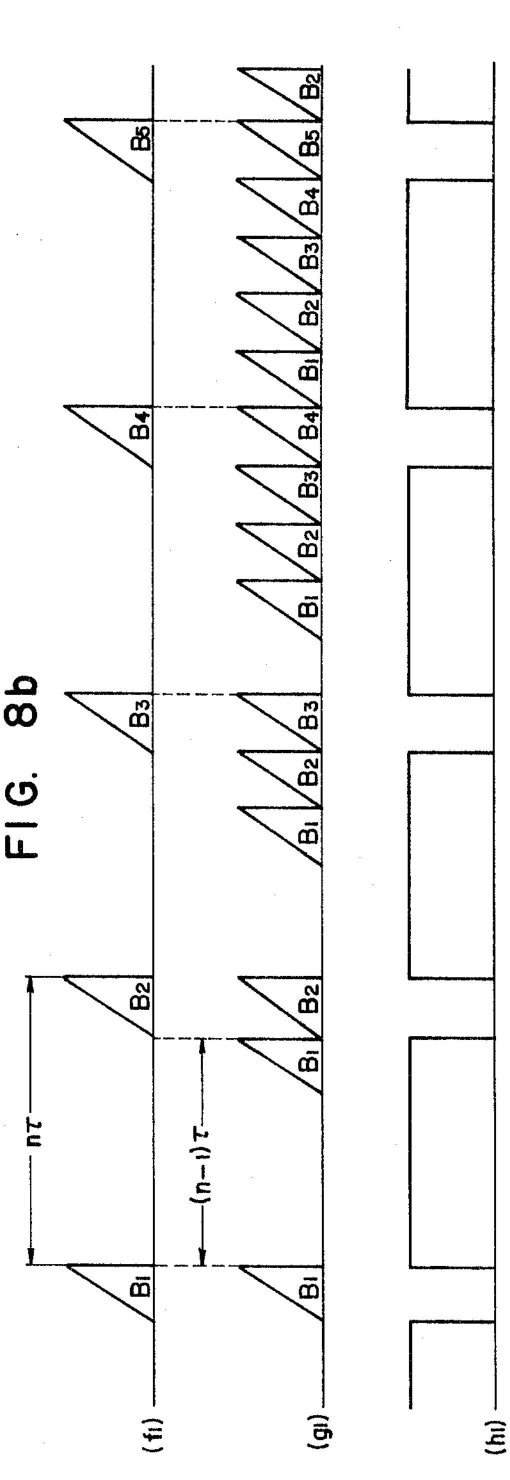
FIGS. 8*a* and 8*b* show waveforms at various points in the embodiment of FIG. 5.
Figure 8A:
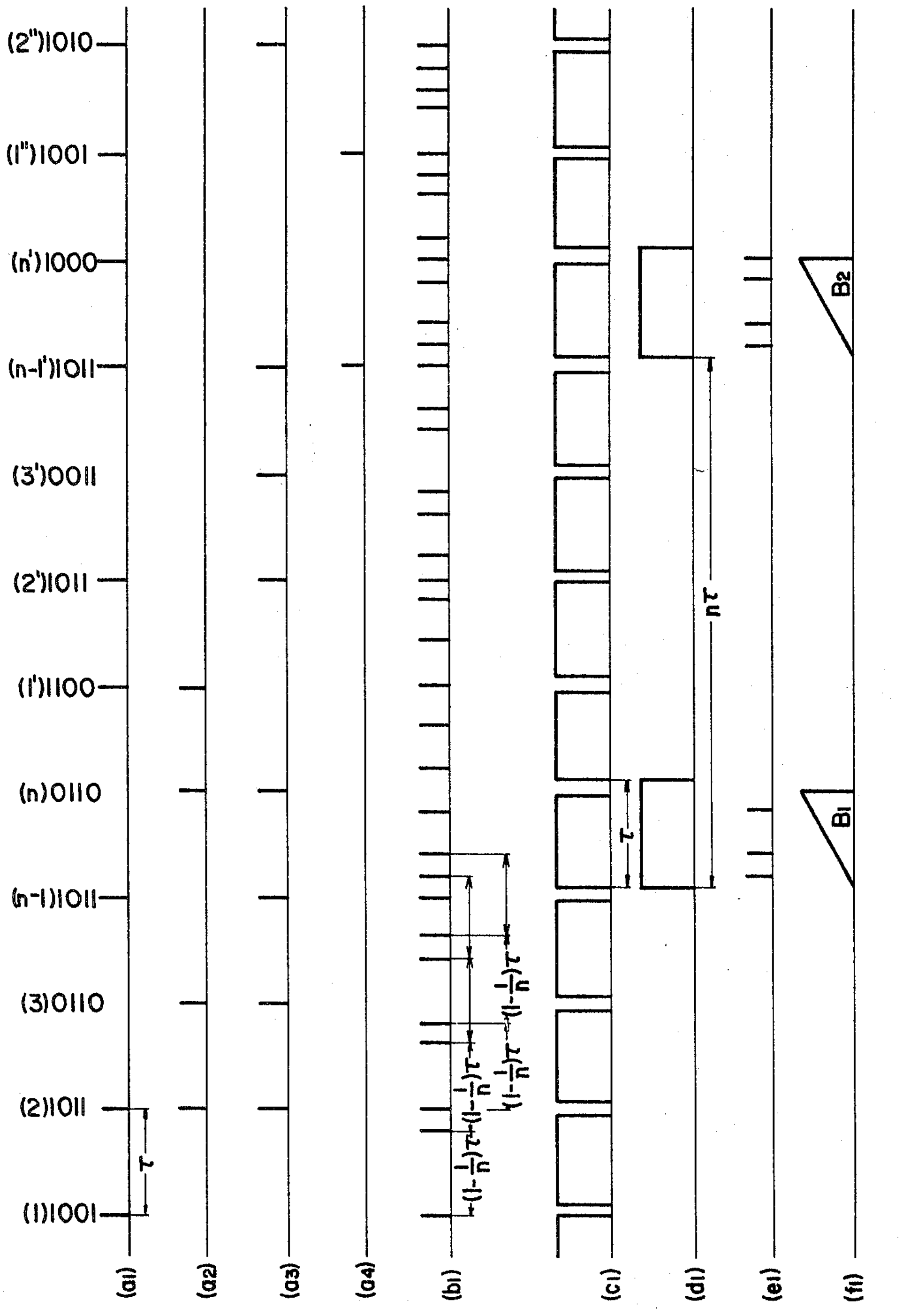

A first timing circuit $705_1$ is controlled by the timing control circuit 103 to generate first and second control pulses ($c_1$) and ($d_1$) as shown in FIG. 8*a*, respectively.

The first control pulse ($c_1$) will be so determined as to have a pause period whose commencement should be a little earlier than the commencement of one digit pulse of the digital pulse code $a_1$ from the coder 501 and whose termination occurs immediately after the termination of the said digit pulse. This pause is periodically generated at an interval of $\tau$.

The second control pulse ($d_1$) should be so determined as to rise immediately after termination of the digital code corresponding to the $n$—1 filter and as to have a duration period of $\tau$, which pulse is also periodically repeated at an interval of $n\tau$.

Since these control pulses are provided as described above, the first gate circuit $702_1$ is shut every $\tau$ period. Consequently, each digital pulse train ($a_1$) is provided with a time delay of $(1-{}^1/n)\tau$ by means of the delay line $704_1$ and the thus delayed pulse is supplied to the OR circuit $701_1$ through the first gate circuit $702_1$ thereby being subjected again to the time delay by the delay line. Repetition of the delay of each digital pulse will continue $n$—1 times, since the first gate circuit $702_1$ is closed at every $\tau$ period in accordance with the first control pulse.

As the result of such repetition of delay, an output pulse train ($b_1$) as shown in FIG. 8*a* is obtained in which the time sequentially arranged digital pulses are provided with a time compression therebetween by $1/n$ in time scale thereof.

Such a time compressed pulse train ($b_1$) as shown in FIG. 8*a* is then supplied to the second gate circuit $703_1$ which is controlled by the second control pulse ($d_1$) and is thereby rendered to be in its "ON" state so that an output pulse group ($e_1$) shown in FIG. 8*a* can be obtained at the output terminal $508_1$.

For the convenience of explanation, the respective pulse groups are designated hereinafter in the form of triangles ($f_1$), as shown in FIGS. 8*a* and 8*b*. Each of the thus obtained pulse groups contains therein a set of representing a number $n$ of frequency sections and it is time sequentially compressed or condensed by $v/n$, therefore, it is quite effective, by itself, even if it is supplied to a conventional displaying device to provide a spectrograph of an input for a substantially long period of time. Further, the present invention is preferably provided with the second time compressor 503. The reason is to facilitate a continuous observation of the analyzed results by the spectrograph 100 in the manner that the respective informations are repeatedly present on the displaying device and that they are transfered from one side to the other by adding the new information on the displaying plane, which is similar to an electric sign board.

The second time compressor 503 is constituted of a plurality of second time compressing circuits 509 to $509_4$ of the same structure each connected to the output terminals $508_1$ to $508_4$ of the corresponding first time compressing circuits $507_1$ to $507_4$ respectively, whereby a set of sequentially arranged parallel 4 bit digital codes previously time compressed are time sequentially supplied in parallel to the respective second time compressing circuits.

Figure 9:
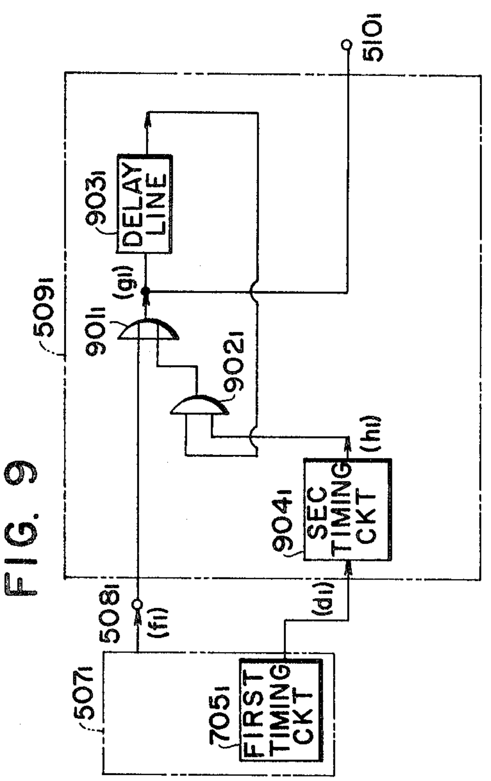

Referring now to FIG. 9, wherein there is provided one of the second time compressing circuits $509_1$ which includes an OR circuit $901_1$ coupled to the output terminal $508_1$, a delay line $903_1$ connected to the output of the OR circuit $901_1$. The delay line $903_1$ operatingly provides a time delay of $(n-1)\tau$ on the signal passing therethrough and the thus delayed signal is again introduced to the OR circuit through a gate circuit $902_1$.

A second timing circuit $904_1$ is controlled by the second control pulse ($d_1$) from the first timing circuit $705_1$ of the first time compressing circuit $507_1$ to generate a gate pulse ($h_1$) as shown in FIG. 8*b*. Accordingly, the gate circuit $902_1$ is shut at every $n$ period. Therefore, each of the pulse groups $B_1$, $B_2$, . . . in the pulse train ($f_1$) of FIGS. 8*a* and 8*b* is provided with a time delay of ($n$—1) by means of the delay line $903_1$, and the repetition of the time delay on one pulse group is limited to $n$—1 times.

As the result of such repetition of delay, an output pulse train ($g_1$) as shown in FIG. 8*b* is obtained at the output terminal $510_1$ wherein the respective pulse groups are shifted by one group width or duration period of $\tau$.

At the other output terminals $510_2$ to $510_4$ time compressed output pulse group trains are similarly obtained, so that the respective 4 bit digital codes representative of the respective frequency sections which are time sequentially supplied to the time compressing device 500 from the real time spectrograph 100 are obtained at the output terminals $510_1$ to $510_4$ in the form of compressed data in their sequential time. Such output digital codes are then supplied to a decoder 504 and transformed into a set of 11 graded level representative signals $E_1$ to $E_{11}$ in response to the designations of the codes.

Figure 10:
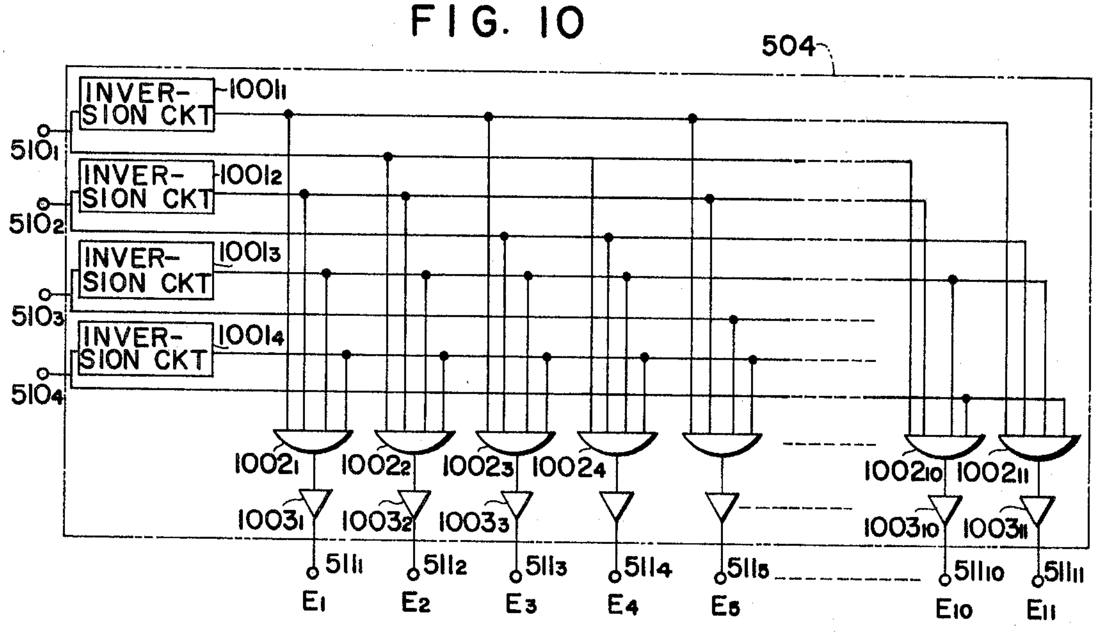

In FIG. 10, there is provided one example of the decoder 504 since it may be selected from conventional structures, wherein $1001_1$ to $100_4$ are inversion circuits connected to the respective output terminals $510_1$ to $510_4$ of the second time compressor 503 for producing the inverted outputs of the signals applied thereto. The AND circuits $1002_1$ to $1002_{11}$ each have four inputs as shown in FIG. 10 so that the respective pulse codes are discriminated by the respective AND circuit and the outputs $E_1$ to $E_{11}$ responsive to the discrimination are transmitted to the output terminals $1004_1$ to $1004_{11}$ through emitter follower circuits $1003_1$ to $1003_{11}$.

These outputs $E_1$ to $E_{11}$ are supplied to a visual display device, which employs a specially developed color displaying device according to the present invention for the purpose of improving the distinguishability by color difference. The color displaying device 505 used in accordance with the present invention includes a color picture tube and its associated driving circuits of conventional structure, which is so operated that the control signals $E_1$ to $E_{11}$ define different colors and its vertical and horizontal scanning speeds are set to be in the periods of $\tau$ and $n\tau$, respectively. Therefore the vertical axis represents a frequency band covered by the plural pass-bands of the respective filters, and the horizontal axis represents time.

In this embodiment, the horizontal scanning period is set to be $n\tau$, so that one information representative of one frequency section obtained from one band-pass filter will be retained for a period of time of $n^2\tau$.

The following conditions are adopted for designing the color displaying device according to the present invention:

1. The quantized intensity levels of the frequency sections are correspondingly represented by different pure colors of high brightness, though as a modification brightness modulation may be combined therewith.
2. The number of colors to be employed should be restricted to a certain value since, if it should fail, the discrimination of the difference in levels will become impossible. Therefore, in this embodiment, one step is selected to be 4 db., and 11 steps make for a 40 db. dynamic range.
3. In order to familiarize the user therewith, the color arrangement is adopted to be in conformity with the red (R)-green (G)-blue (B) arrangement experimentally adopted for use in painting an equal contour map.

It can be set to be any desired color arrangement in determining the different chromaticities. According to the present embodiment, straight lines are provided from red (R) to green (G) and green (G) to blue (B) respectively in the uniform chromaticity scale plane (which is referred as USC plane) and they are equally divided in 10 as shown FIG. 11 to obtain 11 points of chromaticity corresponding to 11 different levels.

Figure 11:
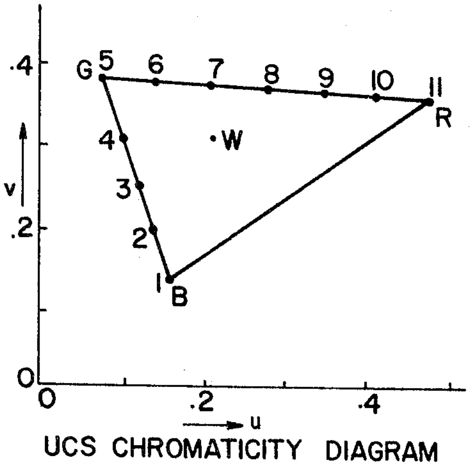
FIGS. 11 and 12 are chromaticity diagrams for the purpose of explaining the mutual relationship between respective chrominances adapted in the present invention.
Figure 12:
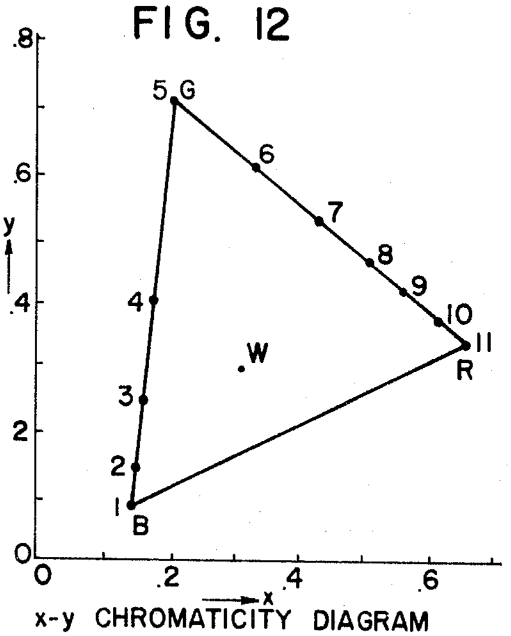

FIG. 11 will then be converted into an $x$–$y$ chromaticity diagram as shown in FIG. 12 and further converted into trichromatic coefficients $r$, $g$, $b$ as shown in Table 1 wherein the 11 levels correspond to the signals $E_1$ to $E_{11}$ respectively.

TABLE 1

| | r | q | b |
|---|---|---|---|
| Level: | | | |
| 1....... | 0 | 0 | 1 |
| 2....... | 0 | 0.165 | 0.835 |
| 3....... | 0 | 0.381 | 0.619 |
| 4....... | 0 | 0.641 | 0.359 |
| 5....... | 0 | 1 | 0 |
| 6....... | 0.244 | 0.756 | 0 |
| 7....... | 0.456 | 0.544 | 0 |
| 8....... | 0.630 | 0.370 | 0 |
| 9....... | 0.762 | 0.238 | 0 |
| 10...... | 0.874 | 0.126 | 0 |
| 11...... | 1 | 0 | 0 |

The reference W in FIGS. 11 and 12 represents a white point.

Figure 13:
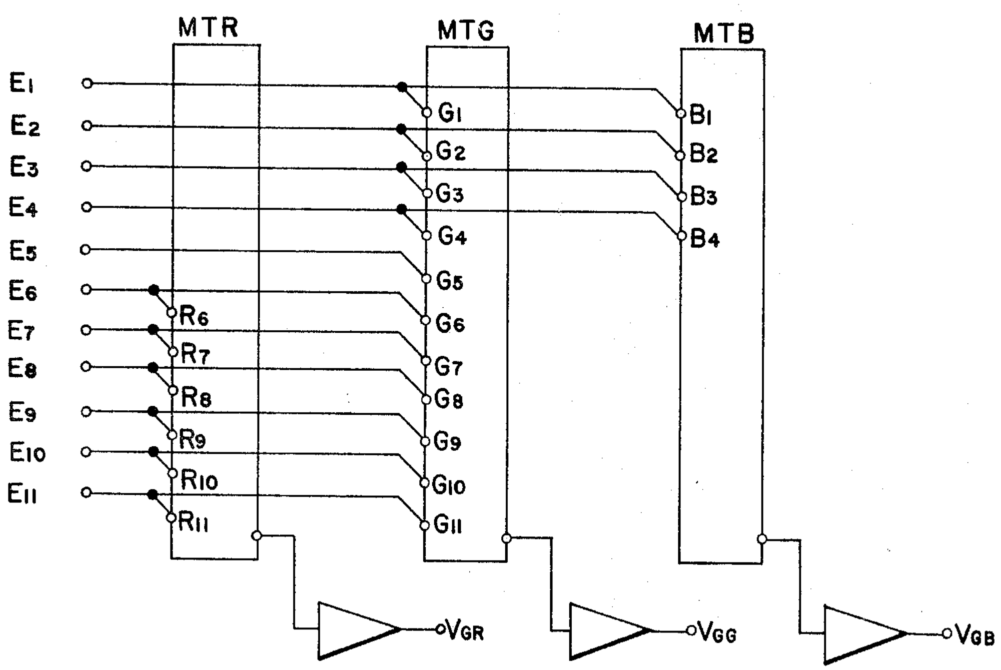

FIG. 13 shows a circuit diagram for generating color control signals $\overline{V}_{GR}$, $\overline{V}_{GG}$, and $\overline{V}_{GB}$ in accordance with Table 1 from the signals $E_1$ to $E_{11}$.

As apparent from Table 1, the red (R) component is included in the signals $E_6$ to $E_{11}$ and the blue (B) component is included in the signals $E_1$ to $E_4$ while the green (G) component is included in all of the signals $E_1$ to $E_{11}$. Decoding circuit matrixes MTR, MTG and MTB operatingly produce an output signal $\overline{V}_G$ as defined in Table 1, respectively, which outputs are amplified by amplifiers $AMP_R$, $AMP_G$ and $AMP_B$ and supplied to the control grids of the tricolor guns of a tricolor picture tube, respectively. The embodied color displaying device is preferably so controlled that the respective colors are present with the same high brightness, for example, of 40 nt cd/cm.².

Figure 14:
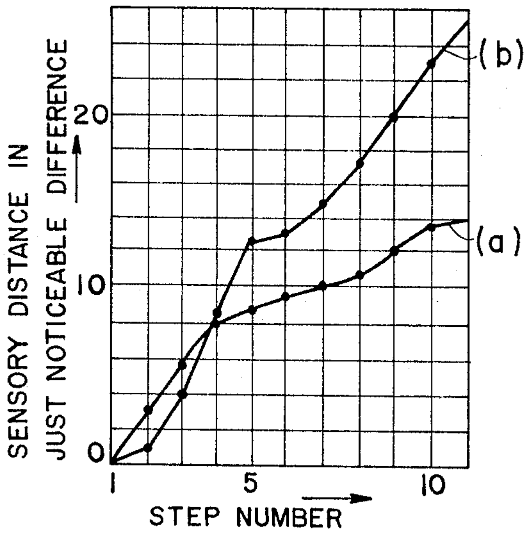
FIG. 14 is a graphical showing of the effect of the present invention in comparison to that of a conventional apparatus.

According to the present invention, its superiority in effectiveness of discrimination between different levels will be obvious from FIG. 14, wherein the abscissa is the step number and the ordinate is the sensory distance in just noticeable distance and there are provided with lines ($a$) and ($v$), the former is obtained by a conventional brightness modulation type displaying device and the latter is obtained by the invented color displaying device.

As will be seen from FIG. 14, 25 sensorily distinguishable steps can be expected according to the invented color displaying device while only 14 steps can be obtained from the conventional displaying device of the brightness modulation type. Therefore, selected chromaticity points on the chromaticity plane as shown in FIGS. 11 or 12 may be changed.

The time compressing degree may also be changed wherein $1/n$ is taken in the first time compressor of the present embodiment.

One of the main features of the present invention is that the spectrogram is displayed on a color picture tube in real time in the coded contour form resembling a contour map by converting the spectrum levels to different colors.

Another feature is that the spectrum pattern can be retained for a certain period of time and conveyed from one side to another on the color picture plane by repeatedly applying a set of time compressed informations to be displayed in in synchronized relation with the scanning over the tube so that they are shifted in the said period of time.

Still another feature is that the colored displaying device according to the present invention may be used in any other application to provide a visual display in response to informations other than a frequency spectrum.

We have shown and described an embodiment in accordance with the present invention. It is understood that the same is not limited thereto but is susceptible of numerous changes and modifications as known to a person skilled in the art and We, therefore, do not wish to be limited to the details shown and described herein, but intend to cover all such changes and modifications as are obvious to one of ordinary skill in the art.

We claim:

1. A frequency spectrum analyzer comprising:
   a frequency spectrograph for repeatedly analyzing an input signal applied thereto and for separating said input signal into a plurality of different frequency components;
   coder means for deriving a train of time sequentially aligned digital pulse codes each representing the intensity of one of said separate frequency components, respectively;
   first time compressor means for grouping said digital pulse codes into groups of a certain number each and for providing time compression within each group between the digital pulse codes so as to form a train of time sequentially aligned pulse code groups;
   second time compressor means for repeatedly shifting each one of the pulse code groups to a preceding position from its succeeding one in the pulse code groups a limited number of times, respectively, so as to form a train of time compressed pulse code groups; and
   a visual display device for operatingly providing a visual display in response to said train of shifted pulse pulse code groups, whereby a visual shiftable frequency spectrogram is obtained.

2. A frequency spectrum analyzer according to claim 1, which further comprises decoder means for operatingly generating a plurality of level representative signals in response to the designations of the respective digital pulse codes; and means for operatively generating color defining signals which define a series of predetermined different colors in response to the level representative signals.

3. A frequency spectrum analyzer according to claim 2, wherein said visual display device comprises a color picture tube and its associated driving circuit means for operatingly providing a color display in which respective colors correspond to different intensities of the analyzed frequency components of the input signal.

4. A frequency spectrum analyzer according to claim 3, wherein said frequency spectrograph includes a plurality of band-pass filters connected in parallel to a source of input signals and each having a band-pass forming a respective section of a frequency spectrum and a sequencer for consecutively connecting said band-pass filters to an output terminal.

5. A frequency spectrum analyzer according to claim 4, wherein said coder means is provided as an analog-to-digital converter connected to the output terminal of said frequency spectrograph.

6. A frequency spectrum analyzer according to claim 2, wherein said coder means provides a plurality of outputs each supplying a respective digit of said digital pulse codes, and said first time compressor means including first time compressor circuits connected respectively to each output of said coder means.

7. A frequency spectrum analyzer according to claim 6, wherein said first time compressor circuits each include a first delay line, first gating means selectively connecting an output of said coder means to said delay line, second gating means connecting the output of said delay line to said first gating means, first timing means for actuating said second gating means to effect recirculation of said applied digit through said delay line a predetermined number of times, and third gating means responsive to said timing means for connecting the output of said first gating means to an output terminal after receipt of said certain number number of code pulses.

8. A frequency spectrum analyzer according to claim 7, wherein said second time compressor means includes second time compressor circuits connected respectively to to the output of each first time compressor circuit.

9. A frequency spectrum analyzer according to claim 8, wherein said second time compressor circuits each include a second delay line, fourth gating means selectively connecting a respective first time compressor circuit to said second delay line, fifth gating means connecting the output of said second delay line to said fourth gating means, and second timing means responsive to said first timing means for actuating said fifth gating means effect recirculation effect recirculation of said pulse groups delay said second delay line a predetermined number of times.

10. A frequency spectrum analyzer according to claim 3, wherein said frequency spectrograph includes band-pass filter means sequentially and repeatedly providing an array of different frequency band-pass characteristics each of which relating to a different relatively narrow frequency band and all of which together encompassing a relatively wide frequency band input signal, so that said input signal is repeatedly sampled to thereby obtain as its output a train of time sequentially aligned different frequency components of said input signal, first connecting means for connecting the input signal to be analyzed to said band-pass filter means, and second connecting means for connecting the output of said band-pass filter means to said coder means; said driving circuit means associated with said color picture tube in said visual display device including means for providing coordinate direction scanning in a color display on said color picture tube, the scanning in one of the coordinate directions being in synchronism with the repetition of said array of the band-pass characteristics by said band-pass means, so that said one coordinate direction represents a frequency axis, whereas the scanning in the other one of the coordinate directions having a relatively long time period so as to be representative of a time period axis, and means for supplying the color defining signals to said color picture color thereby operatingly providing different color displays at different positions in said coordinate display on said color picture tube in response to the level representative signals.

11. A frequency spectrum analyzer according to claim 10, wherein said band-pass filter means includes a bank of filters each of which is a relatively narrow band-pass filter compared to the frequency spectrum width of the input signal to be analyzed, the band-pass frequencies of said filters being arranged in an ordered array, said filters together encompassing the relatively wide frequency band input signal supplied thereto; and scanning means for sequentially sampling the responses of said filters one after another repeatedly and for transfering the sampled output to said second connecting means.